United States Patent [19]

Schweiger

[11] Patent Number: 4,479,456

[45] Date of Patent: Oct. 30, 1984

[54] ANIMAL ACTUATED FEED AND WATER DISPENSING APPARATUS

[76] Inventor: Lonny D. Schweiger, Rte. 1, Box 93A, Fairmont, Minn. 56031

[21] Appl. No.: 448,355

[22] Filed: Dec. 9, 1982

Related U.S. Application Data

[63] Continuation of Ser. No. 298,274, Aug. 31, 1981, Pat. No. 4,377,130.

[51] Int. Cl.³ .......................... A01K 5/00; A01K 7/06
[52] U.S. Cl. .................................................. 119/51.5
[58] Field of Search ...................... 119/53.5, 54, 51.5, 119/56 R

[56] References Cited

U.S. PATENT DOCUMENTS

| | | | |
|---|---|---|---|
| 1,175,124 | 3/1916 | Clough | 119/53.5 |
| 3,536,046 | 10/1970 | Lippi | 119/51.5 |
| 4,242,985 | 1/1981 | Freeborn | 119/54 |

*Primary Examiner*—Hugh R. Chamblee

*Attorney, Agent, or Firm*—Peterson, Palmatier, Sturm, Sjoquist & Baker, Ltd.

[57] ABSTRACT

An animal feeding apparatus includes a bunk, or trough for receiving solid feed and water and animal actuated hopper means disposed over the trough. The water dispensing function is provided by a plurality of valves having operators to be actuated, preferably, by the snout of an animal and which are configured and disposed to inhibit actuation by the animal at such times as the level of liquid in the bunk exceeds a predetermined depth. The feed dispensing function is provided by the simultaneous actuation of an elongated agitator, disposed on one side wall of the hopper and in a dispensing slot in the bottom of the hopper, and a grate, disposed above the agitator and adjacent the slot and the opposite side wall of the hopper, by an agitator arm connected to the agitator and the grate, and extending downwardly into the bunk for actuation by an animal. The agitator and the grate are pivotable about a common axis to provide different radii of oscillation.

13 Claims, 5 Drawing Figures

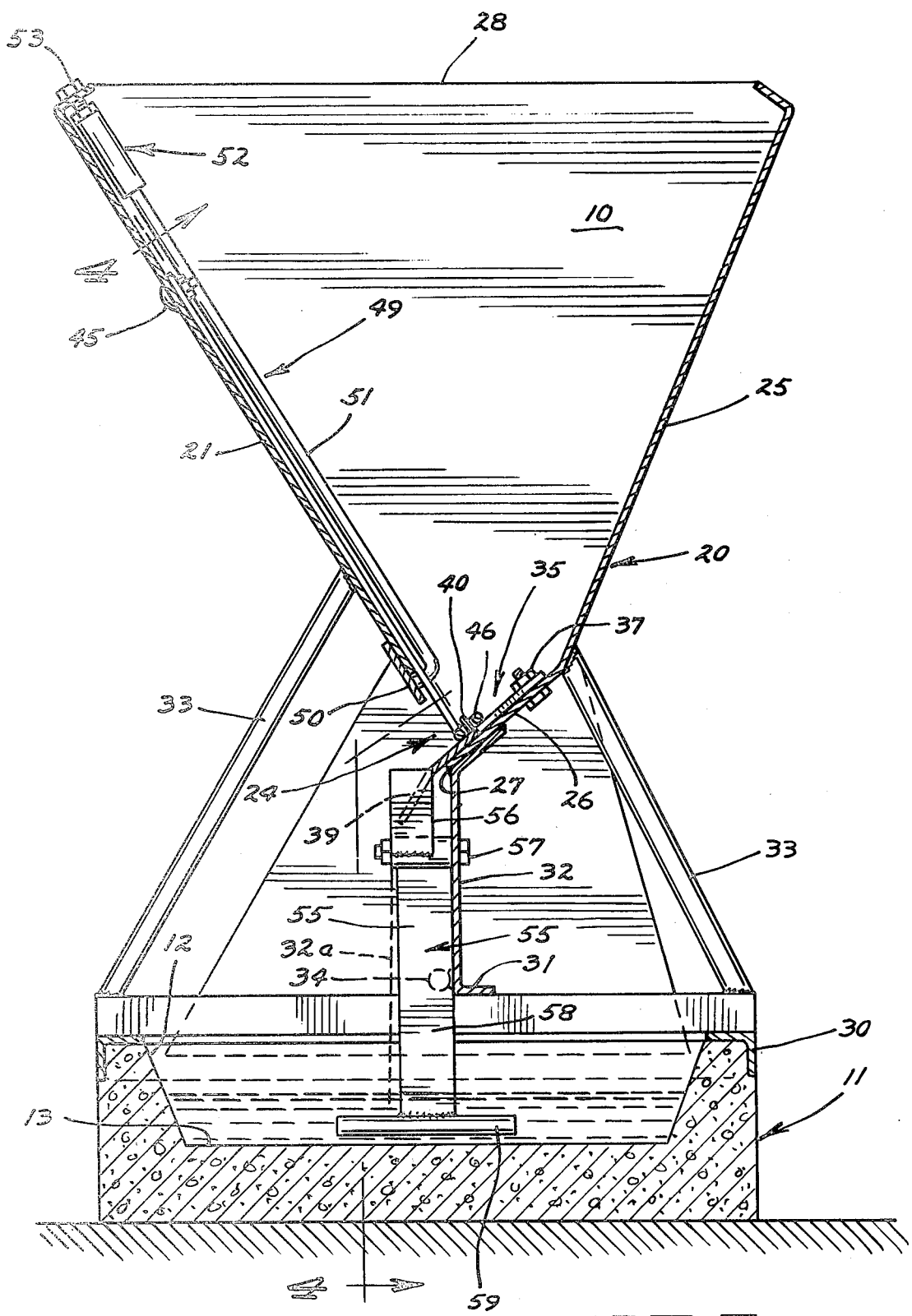

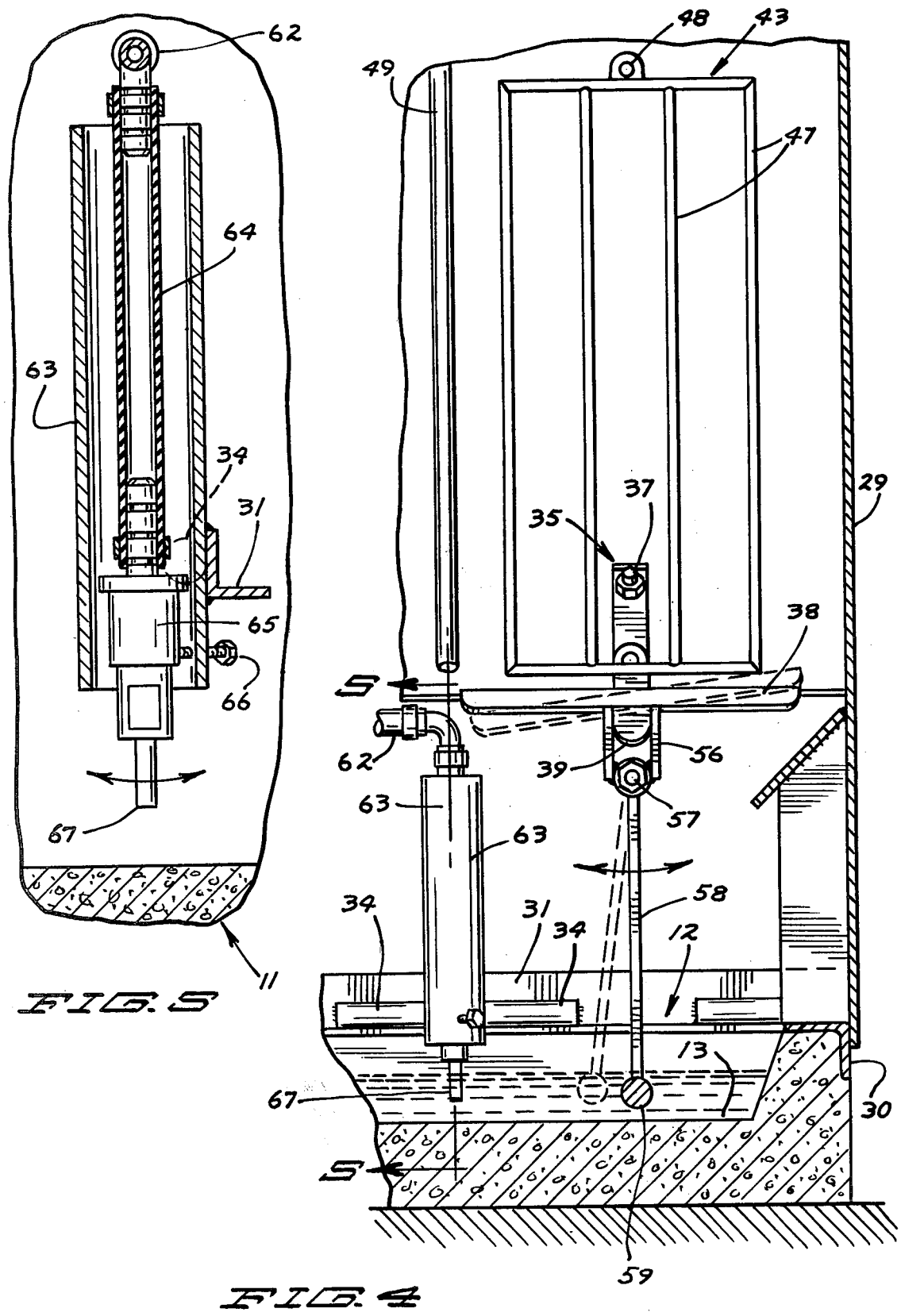

ANIMAL ACTUATED FEED AND WATER DISPENSING APPARATUS

This is a continuation of application Ser. No. 298,274, filed Aug. 31, 1981 now U.S. Pat. No. 4,377,130.

BACKGROUND OF THE INVENTION

1. Field of the Invention

This invention relates to improvements in animal feeding apparatus and is more particularly directed to an animal actuated apparatus in which the flow of the feed and water, as desired by an animal, is completely under the control of the animal whereby the nutritional and life sustaining elements of food and water may be obtained according to the needs of an individual animal.

2. Description of the Prior Art

The prior art is replete with examples of various and sundry apparatus and devices for feeding and watering animals which supply varying amounts of particulate feed material as well as liquids, such as water, to a bunk or trough, for consumption by the animals.

The following is a list of prior art noted as pertinent to the invention of this disclosure;

| U.S. Pat. No. | Inventor | Issue Date |
| --- | --- | --- |
| 1,334,075 | Borton | 3/16/20 |
| 1,362,974 | Wagner | 12/21/20 |
| 1,396,257 | Corington | 11/8/21 |
| 1,553,502 | Boyes | 9/15/25 |
| 2,234,112 | Emrick | 3/4/41 |
| 2,513,200 | Pax | 6/27/50 |
| 3,067,722 | Strong | 12/11/62 |
| 3,144,003 | Jacobs | 8/11/64 |
| 3,536,046 | Lippi | 10/27/70 |
| 3,812,823 | Ridder et al | 5/28/74 |
| 4,242,985 | Freeborn | 1/6/81 |

Of the patents noted above, the Wagner U.S. Pat. No. 1,362,974 for AUTOMATIC STOCK FEEDER is illustrative of one of many devices for delivering feed to an animal and the Lippi U.S. Pat. No. 3,536,046 for COMBINATION FEEDER AND WATERER FOR HOGS illustrates a combined water and feed device. The Freeborn U.S. Pat. No. 4,242,985 for ANIMAL ACTUATED FEEDER illustrates still another recent feeder of substantial complexity.

SUMMARY OF THE INVENTION

It is an object of this invention to provide an improved livestock feeding and watering apparatus that is reliable and uncomplicated in operation while permitting the stock to select portions and proportions of their solid and liquid dietary components in a manner determined by their needs and desire.

On one hand, my apparatus provides an animal controlled liquids dispensing feature that is operative to prevent the accumulation of excessive amounts of liquids in relation to the amount of feed that may be dispensed into the feeding bunk, or trough. The apparatus of this invention further provides a simple, positive, dispensing-agitating function which insures that feed from a hopper is delivered under the control of the animal when needed or desired. As will be explained in more detail below, my invention further includes a means for agitating the feed contained in a hopper to prevent bridging or the like that may interfere with the continuous dispensing of the feed from the bottom of the supply hopper.

With these and other objects of this invention in mind, it may be seen that feed and water dispensing mechanisms are disposed over a trough, or bunk, whereby a hopper is provided with a longintudinally extending slot adjacent one bottom side and a plurality of feed dispensing elements containing portions that are operable through the slot between positions on either side of the slot and which may also include upwardly extending feed agitating means in the form of grates extending upwardly from and driven by the dispensing elements. Liquids dispensing means depend downwardly from the bottom of the hopper to actuators, therefor, that are disposed, with relationship to the bunk, to provide liquid dispensing operation, by an animal's snout, for example, in such a manner that the level of liquid that may be dispensed into the bunk is limited, through the animal's behavior, to a predetermined level.

BRIEF DESCRIPTION OF THE DRAWINGS

FIG. 3 is a sectional view of the apparatus shown in FIG. 1 taken along section line 3—3;

FIG. 4 is a sectional view of a portion of FIG. 3 taken along section line 4—4;

FIG. 5 is an enlarged sectional view of a portion of FIG. 1 taken along section line 5—5.

DESCRIPTION OF THE ILLUSTRATED EMBODIMENT

Figure 2:
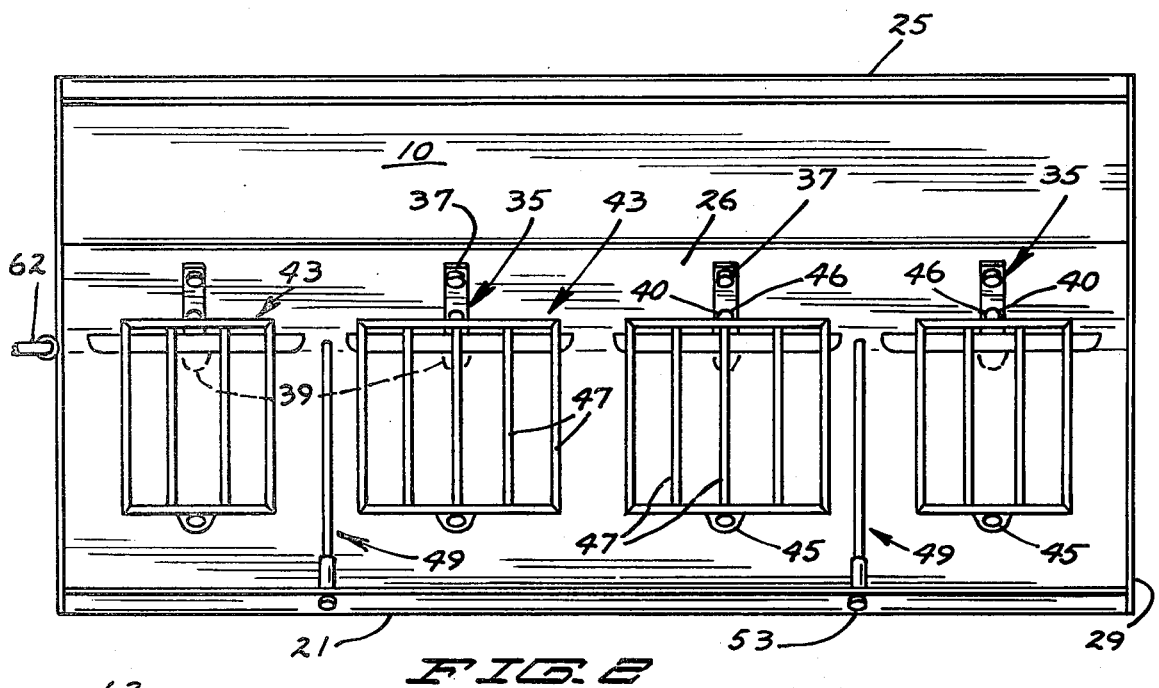
FIG. 2 is a top plan view of the apparatus shown in FIG. 1.

The feeding and watering apparatus of this invention is indicated generally by reference character 10 and is comprised of a bunk or trough, 11, disposed underneath a hopper indicated generally by reference character 20.

Bunk 11 may be of generally rectangular shape and is adapted to receive a volume of water and/or feed in amounts determined by the stock to be fed and includes a bottom portion 13 and a top portion 12 having suitable means, shown in the form of a peripherally disposed metallic angle 30, while the bunk itself may be comprised of suitable material, such as concrete or plastic.

Hopper 20 includes a front sloping wall 21 having a top 22 and a bottom 23; a sloping rear wall 25 that is provided with a bottom portion 26 of lesser slope, with respect to the horizontal plane of bunk 11 and which terminates in a forwardly extending edge, 27, that is disposed underneath and adjacent the lower portion 23 in front wall 21 to define an elongated slot, 24; and a pair of end walls 28 and 29 suitably shaped to extend downwardly into mounting engagement with a frame 30 on the top portion 12 of bunk 11 and are joined to front and rear walls 21 and 25 by suitable connectors, welding or the like. A plurality of leg members 33 are angularly disposed intermediate frame 30 on bunk 11 and suitable locations on front and rear walls 21 and 25 on hopper 20 so as to properly support the hopper in operative dispensing position above bunk 11.

A further vertical support plate 32 is shown disposed extending upwardly from a horizontally disposed angled support member 31 on frame 30, and is suitably connected to bottom portion 26 on rear wall 25.

A cruciform shaped dispenser-agitator bar 35 is shown rotatably disposed on a bolt 37 extending upwardly through bottom portion 26 of rear wall 25 and includes sidewardly extending wing portions 38 forming the principal cross-member, a forwardly extending tongue portion 39 for engagement with an actuator, and an upstanding pin member 40 extending toward the interior of hopper 20. The forward end of tongue 39 may be suitably shaped for engagement by an actuator and it may be noted that the wings 38 are disposed for movement into and out of slot 24 in front wall 21 as bar 35 is caused to rotate about bolt 37. The relative thickness of dispenser-agitator bar 35 may be determined, at least in part, by the relative size of the particulate feed material that is customarily supplied in the form of a dried granular food product. A plurality of hopper agitator grates 43 are shown disposed for rotation about bolt 45, extending through the top of front wall 21, at their top ends and are provided with an appropriately disposed apperture 46 at their lower ends, for operative engagement with pin 40 on dispenser-agitator bar 35 for actuation thereby. Hopper agitator grates 43 are shown as having a plurality of vertically extending bar members 47 and the entire grate may be seen to be operative in a plane substantially adjacent to and parallel with front wall 21 on hopper 20.

A feed regulator 49 is shown adjustably slideably disposed adjacent to slot 24 in front wall 21 and includes a generally horizontally disposed longitudinally elongated gate, or bar, 50, that is mounted on the lower end of an upwardly extending rod 51 that is provided with an adjustment means 52 (shown in the form of a threaded socket) that coacts with a bolt 53 extending through a flange at the top edge of front wall 21.

An actuator arm 55, for dispenser-agitator bar 35, is shown having a bifurcated top end 56 in operative engagement with tongue 39 and is rotatably disposed on a bolt 57 extending through vertical support plate 32 and includes a downwardly depending portion 58 emanating in a generally horizontally extending finger member 59 that is adapted to be engaged by an animal. It may be appreciated that actuator arm 55 provides a side to side motion that is limited in angular extent by the provisions of stop members 34 disposed on center frame member 31.

A liquids manifold 62 is shown extending from the top and horizontally underneath hopper for connection to a plurality of valves 65, in cylindrical support tubes 63 mounted upon and carried by center frame 31. Valves 65, having downwardly extending actuators 67, are removably disposed in the lower end of valve support tube 63 through one or more retaining bolts 66 and are shown connected to manifold 62 through hoses 64. Valve 65 and the lower end of support tube 63 are disposed a suitable vertical distance above the bottom 13 of bunk 11 to tend to inhibit the stock from actuating the valve after the level of liquid in bunk 11 has reached a predetermined desired depth.

A front cover plate 32A may be disposed to extend horizontally in opposed relationship with vertical support plate 32 to form a channel therebetween so that feed exiting from slot 24 in hopper 20 may fall downwardly therebetween and into the center of bunk 11.

With the above description in mind, it may be seen that my invention provides a multi-station animal feeding apparatus that may be used on the front and rear sides by a plurality of animals wherein a liquids dispensing means in disposed between adjacent feed stations and each of the feed stations is provided with a solids feed dispenser and both the liquids and solids dispensers may be operated by, for example, the snout of an animal from either the front or rear sides of the food receiving bunk, or trough. The liquids dispensing means provides an adjustable control over the normal level of fluid to be maintained, by the animals, in bunk 11 and may be reached from all sides and the feed dispensing means, including actuator arm 55 and finger 59 may be actuated from either the front or rear sides of bunk 11.

OPERATION OF THE ILLUSTRATED EMBODIMENT

Figure 1:
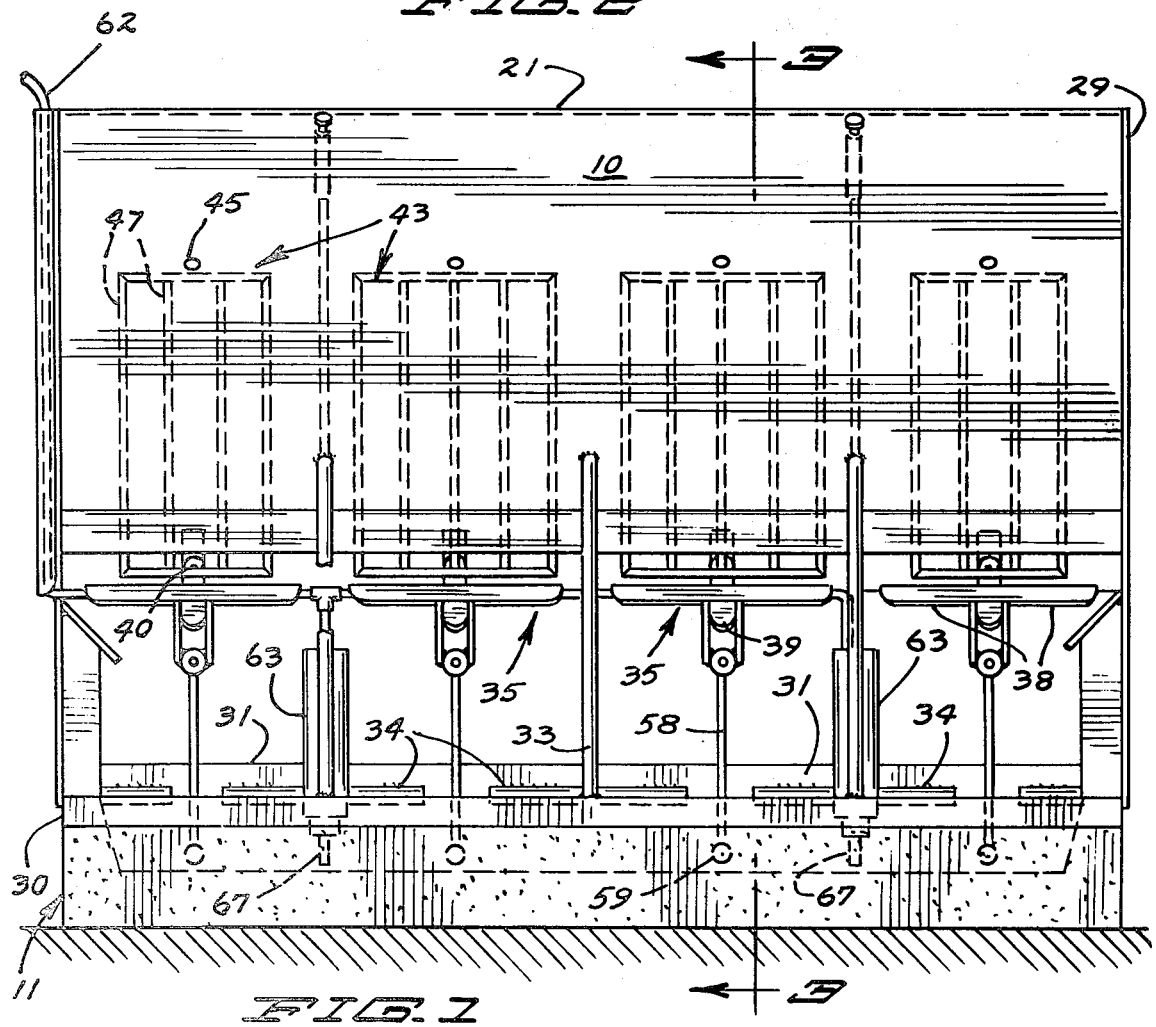
FIG. 1 is a side elevational view of an animal actuated feed and water dispensing apparatus.

With the apparatus assembled as indicated in FIGS. 1 and 2, manifold 62 is connected to a suitable source of liquids under pressure and hopper 20 is filled with dry particulate feed material, appropriate for the type of livestock to be fed. Through instinct, hunger and thirst, the livestock may approach bunk 11 and engage valve finger 67 or actuator arm finger 59 to cause a flow of liquids and/or solids into bunk 11. The level of the liquids will be determined, to a large extent, by the disposition of the lower end of valve tube 63 above the bottom surface 13 on bunk 11 whereby, when the liquid rises to a level at which the nostrils of the snout of an animal become immersed, the animal will be inhibited from actuating valve finger 65 and the animal may then merely drink or may then direct its attention to finger 59 on actuator arm 55, again with its snout, causing dry feed to be dispensed from slot 24 into bunk 11. The dispensing of the feed from hopper 20 is effected by the to and fro sidewise motion of actuator arm 55 which causes a rotation of dispenser-agitator bar 35 about bolt 37 to cause wings 28 to alternately oscillate into and out of slot 24. The oscillatory, rotating motion of cruciform shaped dispenser-agitator bar 35 also causes a rotating oscillating motion of agitator grates 43 about bolts 45 to loosen material adjacent front wall 21 on hopper 20 and allow it to flow freely into proximity of dispenser-agitator bar 35. The opening defined by slot 24 at the bottom of front wall 21 on hopper 20 is adjustable and may be sized to coact with the thickness of dispenser-agitator bar 35 in relationship to the granular size of the particulate feed material. When suitably dimensioned and sized, the oscillating action of dispenser-agitator bar 35 through slot 24 effects a positive displacement, "pumping" action of the material sliding down the inside of front wall 21 into proximity of the inner portion of slot 24.

Thus, according to the needs and desires of the livestock, the individual animals may either drink or feed, or both, and may act according to their learning capacities to satiate their appetites in a manner that is pleasing to their tastes.

I claim:

1. Animal feeding apparatus comprising, in combination;
    a horizontal bunk, for receiving feed and water, disposed on a level surface for access by stock to be fed;
    hopper means, including a generally sidewise opening, elongated feed conveying slot adjacent the bottom, and being disposed over said bunk so that feed, passing through said slot, is distributed into said bunk;
    feed dispensing means, disposed in the slot in said hopper means, including elongated feed agitating and dispensing portions moveable through said feed conveying slot between positions inside and outside of said feed conveying slot and said hopper means;

actuating means operably connected to said feed dispensing means and including an operator arm extending downwardly into said bunk for operative engagement by the head of an animal; and liquid dispensing means disposed on said hopper means adjacent said feed dispensing means 2. The apparatus of claim 1 in which the liquids dispensing means includes an actuator arm and a shield ajdacent thereto for inhibiting the dispensing of liquids when the liquid in the bunk exceeds a predetermined level.

3. A self regulating demand feeder and waterer for hogs, comprising a watertight bunk for the dry feed and water and having a depth well in excess of the maximum depth to which the hogs will immerse their snouts in water, a feed hopper above the bunk and having a mechanical means for dispensing feed from the hopper to drop down into the bunk, the mechanical means including a swingable operating lever extending downwardly into the bunk and causing dispensing of feed when swung by the snouts of the hogs feeding in the bunk, and a water supply directing water into the bunk and having vertically adjustable control valve means for regulating the flow of water, the control valve means having a movable operator located in the bunk and extended toward the bottom thereof and being movable to produce the flow of water into the bunk and to be immersed in said water, the movable operator will be manipulated by the hogs with their snouts to supply water into the bunk along with the feed in the water until the depth of water exceeds the depth at which the hogs will comfortably immerse their snouts whereupon the flow of water will stop when manipulating of the movable operator is discontinued, thereby maintaining a desirable proportion of water and dry feed in the bunk.

4. The feeder and waterer for hogs according to claim 3 wherein the water supply includes pipe means and the control valve means extending downwardly into the bunk, the movable operator being disposed at the lower end portion of the valve means.

5. The feeder and waterer for hogs according to claim 4 and a rigid and stationary tube embracing the control valve means and having a lower end disposed immediately above said movable operator.

6. A self regulating demand feeder and waterer for hogs, comprising an elongate watertight bunk for the dry feed and water and having a top edge confining water against spilling and also having a bottom below said top edge and establishing a significant depth well in excess of the maximum depth to which hogs will immerse their snouts in water, hog operated and regulated feed and water supplies respectively depositing feed and water into the bunk, the water supply having a control valve with a movable operator located entirely in the bunk and adjacent the bottom thereof and being movable to produce flow of water into the bunk and to be immersed in the water, the water supply having a vertically disposed rigid shielding means extending downwardly into the bunk to a location below the top edge thereof and the shielding means having a vertically adjustable lower portion adjacent to and above the level of the movable operator and allowing access to the operator only from below the shielding means, and the feed supply including a hopper above the bunk and having a discharge slot extending along the bunk and spaced above the bunk by a distance having the order of magnitude of several multiples of the depth of the bunk, there being open and unobstructed space below the discharge slot and below the slot and the adjacent edge of the bunk to permit the feed to free fall without confinement, and the feed supply having mechanical means for dispensing feed from the hopper and slot and including a swingable operating lever extending downwardly into the bunk to be operated by the hogs.

7. The self regulating demand feeder and waterer for hogs according to claim 6 and there being a plurality of operating levers and movable operators spaced from each other along the length of the bunk.

8. The self regulating demand feeder and waterer for hogs according to claim 7 and the operating levers being disposed between adjacent movable operators.

9. A self regulating demand feeder and waterer for hogs, comprising an elongate watertight bunk for the dry feed and water and having a top edge confining water against spilling and also having a bottom below said top edge and establishing a significant depth well in excess of the maximum depth to which hogs will immerse their snouts in water;

hog operated and regulated feed and water supplies for depositing feed and water into the bunk, each having lever actuator means extending downwardly to the bottom of said bunk, and at least one of said regulated feed and water supplies being operable to feed diminishing amounts of feed or water through actuation of said lever means as the level of feed and water in said bunk rises to a predetermined level above the bottom of said bunk.

10. The apparatus of claim 9 in which the water supply includes a valve connected to a source of water, the valve is actuated by a downwardly depending lever means extending into proximity to the bottom of the bunk and said valve is vertically adjustable shield means to adjustably extend into the bunk to a desired, predetermined water level in said bunk.

11. The apparatus of claim 9 in which the feed supply includes a hopper having opposite walls disposed above the bunk, an adjustable elongate discharge slot formed intermediate the lower ends of said walls, feed dispensing means, normally disposed within said slot and operable in parallelism on top of one of said walls and actuable to an outwardly, forwardly extending position of said slot through actuation of said lever means, said slot having a height dimension equal to the thickness of the dispensing means and a predetermined diameter of the feed to be dispensed, and the lever means being operable to dispense lesser amounts of feed as the depth of the materials in the bunk increases.

12. The apparatus of claim 9 in which a plurality of lever means are disposed in laterally spaced relationship along the length of the bunk.

13. The apparatus of claim 12 in which the lever means for dispensing water are disposed interemediate and adjacent to lever means for dispensing feed.

* * * * *

UNITED STATES PATENT AND TRADEMARK OFFICE
CERTIFICATE OF CORRECTION

PATENT NO. : 4,479,456
DATED : October 30, 1984
INVENTOR(S) : Lonny D. Schwieger It is certified that error appears in the above-identified patent and that said Letters Patent are hereby corrected as shown below:

On the title page, Item [76] Inventor:

Please correct inventor's name by deleting "Schweiger" and substituting --Schwieger--.

Signed and Sealed this

Nineteenth Day of March 1985

[SEAL]

Attest:

DONALD J. QUIGG

Attesting Officer     Acting Commissioner of Patents and Trademarks